Oct. 13, 1925.
S. RUBEN
1,556,633
ELECTRICAL CONTROL METHOD
Filed Sept. 13, 1924
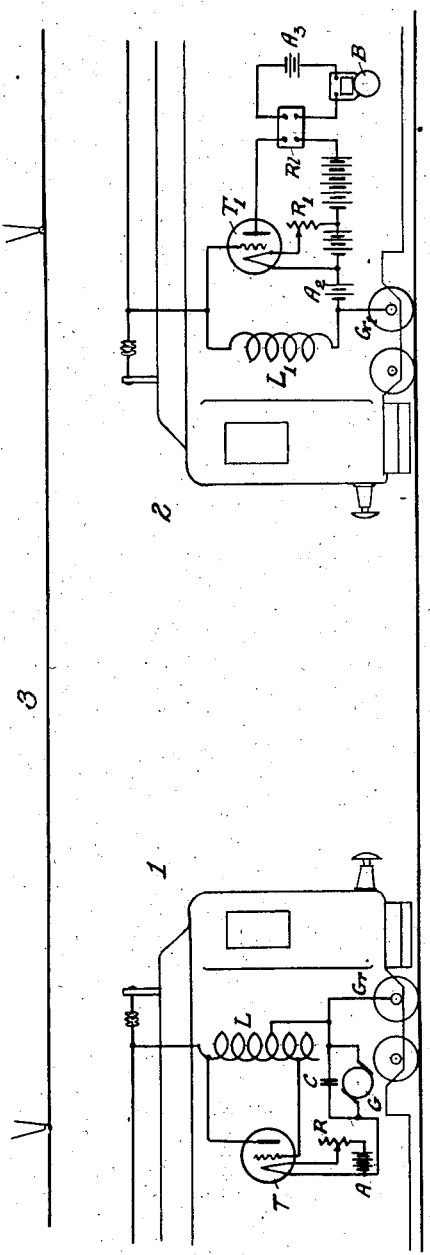
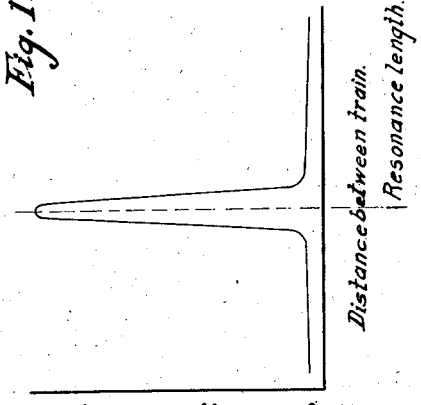
Inventor
SAMUEL RUBEN
By his Attorney M. W. Clephane Patented Oct. 13, 1925.

1,556,633

UNITED STATES PATENT OFFICE.

SAMUEL RUBEN, OF NEW YORK, N. Y.

ELECTRICAL CONTROL METHOD.

Application filed September 13, 1924. Serial No. 737,601.

*To all whom it may concern:*

Be it known that SAMUEL RUBEN, a citizen of the United States of America, residing at 70 East 93rd Street, New York city, county, and State, has invented new and useful Improvements in Electrical Control Methods, of which the following is a specification.

This invention relates to a method for operating control devices by radio impulses; and more particularly, it relates to a system for the electrical actuation of means controlling such devices as brakes, signals or the supply of energy upon moving vehicles approaching a source of oscillations, or similarly controlled devices at points variable in distance from such source.

One of its chief objects is to provide a dependable means for preventing damage to or by a moving vehicle, which is operable irrespective of magnetic or other external conditions.

In its broad aspects this control is based upon the employment of oscillatory transmitted energy at its resonance value for the actuation of devices operating brakes, signals, etc., upon moving vehicles. But it is also adapted to the actuation of devices at fixed points, such, for example, as a gate or signal, when, by the change of distance between the source of oscillations and the receiving equipment actuating the device to be operated, such energy reaches its maximum value. The source of oscillations may be located upon a moving or a stationary base, the oscillations being conducted partially over an insulated electrical conducting circuit, such, for instance, as a telegraph or telephone line, which acts as a tuning element of the circuit by reason of its varying length which changes with the movement of the vehicle carrying the transmitting or the receiving equipment; that is, with the distance separating the two equipments.

By the terms of this invention a transmitter of oscillations is operated at a definite wave length and a conducting line is made to serve as a carrier wire to electrostatically couple it with the receiving equipment, by means of which, the control device to be operated, is actuated. This gives a tuned circuit of such value that the conducting circuit acts as the additional inductance necessary to obtain a resonance circuit between the transmitting and the receiving apparatus, when the space therebetween, that is, the conductor length, reaches a predetermined value, at which the conducting circuit is in resonance with the transmitted oscillations, and the energy at the receiving apparatus is employable to control the device.

While the system is especially adapted for use upon vehicles, such as trains travelling upon the same track, it is also adapted for use in operating signals or other devices at fixed points, such as crossing gates, etc., variable in distance from moving sources of oscillations.

The receiver has insufficient inductance to be in resonance with the transmitter, except in combination with the stationary wire conductor system which, through its electrostatic connection, constitutes a part of the tuning system. The adjustment of the system is such that, as the receiving equipment approaches a predetermined distance from the transmitter, or a given length of conductor wire extends therebetween, the receiving equipment approaches a resonance value in respect to the transmitted oscillations and when the predetermined distance is reached, there is a transmission of maximum energy, causing the actuation of the device controlling the brakes, signal or energy supply. However, for actuation at the receiving equipment, it is not essential that the maximum energy be employed; energy at a predetermined lower value may be so employed.

In order to afford a full understanding of the principles of the invention, one embodiment or arrangement thereof in a specially desirable practical form is illustrated in the accompanying drawings, and is hereinafter described in detail for the sake of a concrete example; but it is to be understood that the invention is not limited to this particular form or arrangement.

In the drawings referred to,

Fig. 1 is a diagrammatic illustration of the invention as applied to two railroad cars, with track and telegraph wire equipment. Fig. 2 is a curve showing the relation between the received signal energy and the distance between the transmitting and receiving apparatus.

Referring more particularly to Fig. 1, 1, 2 and 3 respectively represent the vehicle carrying the transmitting apparatus, that carrying the receiving equipment and signal, and an overhead conductor wire system. On vehicle 1, G represents a generator and T an oscillator, L, A, R, C and Gr, being respectively the designations of commonly used elements of a radio circuit. The radio equipment of vehicle 2 is employed to actuate a bell signal, B. $R_1$ is a relay in the circuit. In operation, generator G, through vacuum tube T, generates oscillations which are radiated to the conductor wire system 3, by electrostatic conduction, and conducted likewise to the receiving equipment on vehicle 2. When, by the movement of one or both of the vehicles, the conductor wire system between the two equipments has reached a fixed length, the conducted energy is at its maximum value, as indicated by Fig. 2, at which point the energy may be at its predetermined value for the operation of the bell signal.

What I claim is,

1. A system for the operation of a control device, comprising, in combination, a source of high frequency oscillations, an electrical receiving apparatus selectively responsive to said oscillations, and arranged and adapted to actuate said control device, and a stationary conducting means in electrostatic connection with said source and receiving apparatus and adapted to serve as a tuning element in the circuit thereof by the relative movement thereof.

2. A system for the operation of a control device, comprising, in combination, a source of high frequency oscillations, an electrical receiving apparatus selectively responsive to said oscillations, and arranged and adapted to actuate said control device, a stationary conducting means in electrostatic connection with said source and receiving apparatus, and means for varying the value of said oscillations by varying the length of said conducting means between said source and receiving apparatus by the relative movement thereof.

3. A system for the operation of a control device, comprising, in combination, a source of high frequency oscillations mounted upon a vehicle, an electrical receiving apparatus selectively responsive to said oscillations, and arranged and adapted to actuate said control device, and electrostatic coupling between said source and receiving apparatus, and means for varying the energy of said oscillations impressed upon said receiving apparatus by varying the length of said coupling by the movement of said vehicle.

4. A system for controlling the operation of a vehicle, comprising, in combination, a source of high frequency oscillations, an electrical receiving apparatus mounted upon a vehicle and selectively responsive to said oscillations and adapted to actuate a brake control device upon said vehicle, and a stationary electrical conducting means electrostatically coupled to said source and receiving apparatus and adapted to serve as a tuning element of the circuit thereof by the movement of said vehicle.

In testimony whereof, SAMUEL RUBEN has signed his name to this specification this 28th day of August 1924.

SAMUEL RUBEN.